(12) United States Patent
Stenvall (10) Patent No.: US 11,117,140 B2
(45) Date of Patent: Sep. 14, 2021

(54) FILTER

(71) Applicant: Volvo Car Corporation, Gothenburg (SE)

(72) Inventor: Olof Stenvall, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 270 days.

(21) Appl. No.: 16/394,001

(22) Filed: Apr. 25, 2019

(65) Prior Publication Data

US 2019/0344288 A1 Nov. 14, 2019

(30) Foreign Application Priority Data

May 8, 2018 (EP) ..................................... 18171180

(51) Int. Cl.
| | | |
|---|---|---|
| *B01D 46/00* | (2006.01) | |
| *B01D 46/10* | (2006.01) | |
| *F24F 8/99* | (2021.01) | |
| *B03C 3/28* | (2006.01) | |
| *B03C 3/78* | (2006.01) | |

(52) U.S. Cl.
CPC ............ *B03C 3/28* (2013.01); *B01D 46/0032* (2013.01); *B01D 46/10* (2013.01); *B01D 2221/16* (2013.01); *B01D 2275/205* (2013.01); *B03C 3/78* (2013.01); *B03C 2201/30* (2013.01)

(58) Field of Classification Search
CPC ............... B01D 46/10; B01D 46/0032; B01D 2221/16; B01D 2279/40; B03C 2201/30; F24F 8/99; F24F 8/10

USPC .............. 55/385.1, 385.3, 515; 96/147, 152; 454/370, 83, 156

See application file for complete search history.

(56) References Cited

U.S. PATENT DOCUMENTS 4,052,983 A * 10/1977 Bovender .............. A62B 23/06
128/204.12
4,098,591 A 7/1978 Van Diepenbroek et al.
5,358,442 A * 10/1994 Ekinci ................... B60H 1/262
454/143

(Continued)

FOREIGN PATENT DOCUMENTS

| EP | 1837066 A2 | 9/2007 |
|---|---|---|
| WO | 0061262 A1 | 10/2000 |
| WO | 2005068053 A1 | 7/2005 |

OTHER PUBLICATIONS

Nov. 7, 2018 European Search Report issue on International Application No. EP18171180.5.

(Continued)

*Primary Examiner* — Minh Chau T Pham
(74) *Attorney, Agent, or Firm* — Clements Bernard Walker; Christopher L. Bernard (57) ABSTRACT

A vehicle including at least one filter for trapping particles in a vehicle's outside surrounding air. The filter includes a first part and a second part. The first part includes a first cilia layer. An air inlet is arranged in one end of the filter. The first cilia layer is arranged to trap at least some particles in the air flowing into the filter via the air inlet when the first cilia layer is electrostatically charged by an electromagnetic field. The filter is connected to a vehicle chassis and such that one of the first and second parts faces the vehicle chassis and the other part faces ground.

12 Claims, 9 Drawing Sheets

(56) References Cited

U.S. PATENT DOCUMENTS

| | | | | |
|---|---|---|---|---|
| 5,509,853 | A * | 4/1996 | Wells | B01D 53/74 |
| | | | | 454/370 |
| 7,588,619 | B2 * | 9/2009 | Chilton | B01D 46/528 |
| | | | | 55/521 |
| 7,976,618 | B2 * | 7/2011 | Geurtz | B01J 20/28057 |
| | | | | 96/131 |
| 8,025,132 | B2 * | 9/2011 | Krantz | B60L 15/2036 |
| | | | | 188/218 A |
| 8,920,537 | B2 * | 12/2014 | Seike | B03C 3/017 |
| | | | | 95/3 |
| 9,308,484 | B1 * | 4/2016 | Harper | B01D 46/10 |
| 2005/0000197 | A1 * | 1/2005 | Krantz | F16D 65/0031 |
| | | | | 55/385.3 |
| 2006/0107636 | A1 * | 5/2006 | Gage | B01D 46/0023 |
| | | | | 55/385.3 |
| 2007/0056254 | A1 * | 3/2007 | Relyea | B01D 46/0032 |
| | | | | 55/385.3 |
| 2007/0095211 | A1 | 5/2007 | Lee et al. | |
| 2009/0000257 | A1 * | 1/2009 | Krantz | F16N 31/002 |
| | | | | 55/385.3 |
| 2011/0214568 | A1 * | 9/2011 | Krantz | F16D 65/0031 |
| | | | | 95/273 |

OTHER PUBLICATIONS

Pending claims.
Office Action received.

\* cited by examiner

FILTER

CROSS-REFERENCE TO RELATED APPLICATION

The present disclosure claims the benefit of priority of European Patent Application No. 18171180.5, filed on May 8, 2018, and entitled "FILTER," the contents of which are incorporated in full by reference herein for all purposes.

TECHNICAL FIELD

Embodiments herein relate generally to a vehicle comprising a filter. More particularly the embodiments herein relate to trapping particles in a vehicle's outside surrounding air.

BACKGROUND

Air pollution has an impact on people's health, and the problem with air pollution has therefore been addressed for many years. There are many sources of air pollution such as for example motor vehicles, industrial plants etc. Efforts have been spent to reduce the air pollution for example by reducing vehicle exhaust, etc. However, the air pollution still poses a health risk in today's society, and it is therefore a need to at least mitigate or solve this issue.

SUMMARY

An objective of embodiments herein is therefore to obviate at least one of the above disadvantages and to improve cleaning of the vehicle's outside surrounding air.

According to a first aspect, the object is achieved by a vehicle comprising at least one filter for trapping particles in a vehicle's outside surrounding air. The filter comprises a first part and a second part. The first part comprises a first cilia layer. An air inlet is arranged in one end of the filter. The first cilia layer is arranged to trap at least some particles in the air flowing into the filter via the air inlet when the first cilia layer is electrostatically charged by an electromagnetic field. The filter is connected to a vehicle chassis and such that one of the first and second parts faces the chassis and the other part faces ground.

According to a second aspect, the object is achieved by a method for trapping particles in a vehicle's outside surrounding air with at least one filter. The method comprises: connecting the filter to a vehicle chassis and such that one of a first and second parts comprised in the filter faces the vehicle chassis and the other part faces ground, the first part comprising a first cilia layer, and an air inlet is arranged in one end of the filter; charging the first cilia layer with an electromagnetic field; and trapping at least some particles in the air flowing into the filter via the air inlet when the first cilia layer is electrostatically charged by the electromagnetic field.

According to a third aspect, the object is achieved by a method for connecting, to a vehicle, at least one filter for trapping particles in a vehicle's outside surrounding air. The method comprises: providing a first cilia layer to a first part of the filter; providing an air inlet in one end of the filter; and connecting the filter to a vehicle chassis and such that one of the first part and a second part comprised in the filter faces the vehicle chassis and the other part faces ground.

The first cilia layer is arranged to trap at least some particles in the air flowing into the filter via the air inlet when the first cilia layer is electrostatically charged by an electromagnetic field.

Thanks to the electromagnetic field already present in the vehicle, e.g. created by the vehicle's battery, the filter traps particles in the vehicle's outside surrounding air which leads to improved cleaning of the vehicle's outside surrounding air.

Embodiments herein afford many advantages, of which a non-exhaustive list of examples follows.

One advantage of the embodiments herein is that if the filter is installed in multiple vehicles, it will have a significant impact on the air pollution.

Another advantage of the embodiments herein is that since the filter can be opened and closed, it is easy to clean the filter in e.g. in connection with vehicle service or at another occasion for example at an environmental service station. This way, the pollutant particles can be handled in an environmental friendly way.

By being able to clean the filters in a controlled way, this could allow a process for separating different aerosols from each other and thereby have the possibility to reuse or recycle those substances which are appropriate for such purposes.

Larger objects such as e.g. insects do not have to be affected by the filter, i.e. they are not trapped in the filter due to that the size of the air inlet is smaller than the object size.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DESCRIPTION OF EMBODIMENTS

Figure 1:
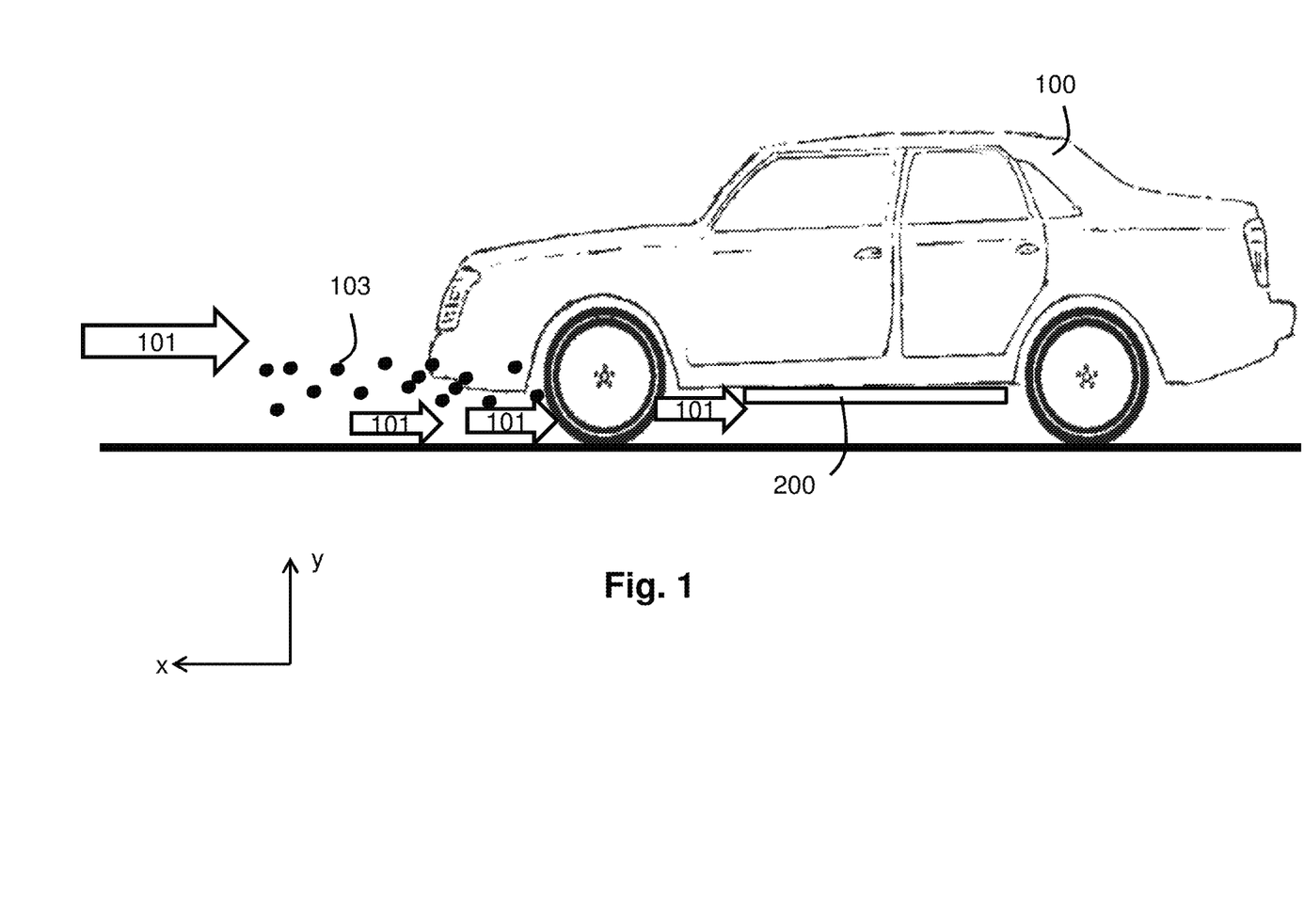
FIG. 1 is a schematic drawing illustrating a vehicle.

FIG. 1 illustrates a vehicle 100. The vehicle 100 may be any arbitrary vehicle, for instance a car, truck, lorry, van, bus, motorcycle etc. The vehicle 100 may be at least partly autonomous or self-driven, it may be completely autonomous or self-driven, or it may be non-autonomous etc.

When the vehicle 100 is moving, outside air surrounding the vehicle 100 flows towards the vehicle 100 in the direction illustrated with arrows in FIG. 1. The air flow is illustrated with reference number 101 in FIG. 1. The driving direction of the vehicle 100 is towards the left, i.e. the x-direction as illustrated with the coordinate system in FIG.

1. The air comprises particles 103 which may be seen as polluting particles. The particles 103 may comprise Pb, Hg, soot etc. The particles 103 may be visible or non-visible to the human eye. If the air 101 is clean, there will be no particles 103 in it; thus the particles 103 pollute the air 101. The term contaminated, unclean and polluted may be used interchangeably when referring to air 101 comprising the particles 103.

A filter 200 is connected to the vehicle 100, i.e. to the vehicle chassis. Using other words, the filter 200 is connected to the underside of the vehicle 100. The filter 200 will be described in detail below.

Directions as used herein, e.g. horizontal, vertical, lateral, relate to when the vehicle 100 is standing on flat ground. The filter 200 may be manufactured, stored, transported and sold as a separate unit. In that case, the directions may differ from when mounted in the vehicle 100.

Figure 2:
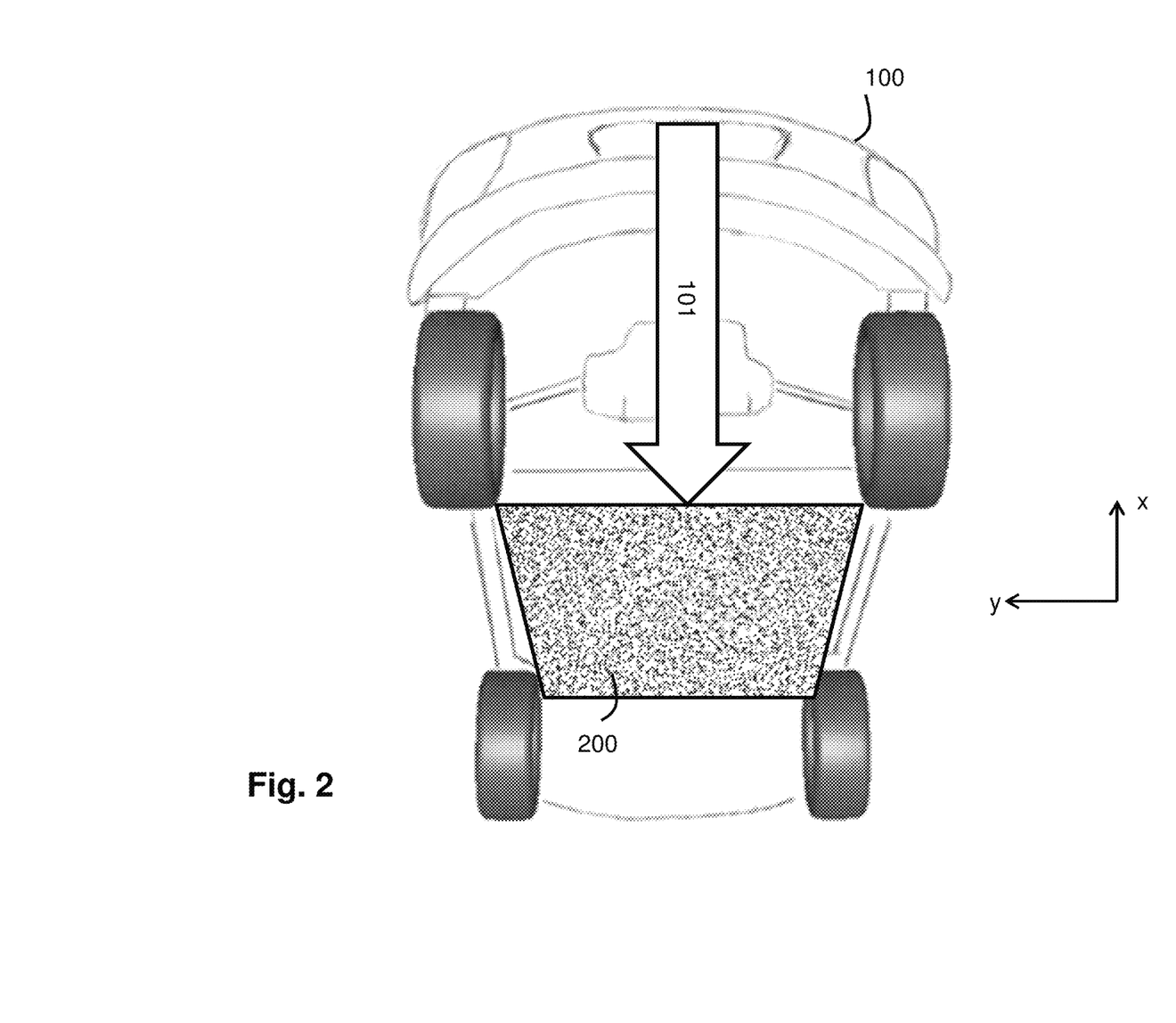
FIG. 2 is a schematic drawing illustrating a vehicle with a filter.

FIG. 2 illustrates the vehicle 100 seen from below. The air flow 101 is illustrated with one arrow in FIG. 2, where upwards in the x-direction is the driving direction where the air flow 101 is coming in. The filter 200 is located under the vehicle 100 such that particles 103 in the air flow 101 flowing under the vehicle 100 is trapped in the filter 200 by means of an electromagnetic field. The filter 200 may therefore be seen as an electrostatic air cleaner or a device that uses an electric charge to remove certain impurities, i.e. particles 103, in the air 101. The filter 200 traps the particles 103 by applying energy only to the particles 103 that is being trapped, without significantly impeding the air flow 101. This will be described in more detail below.

FIGS. 3a, 3b, 3c and 3d illustrate some example embodiments of the filter 200. As seen in all FIGS. 3a-3d, the filter 200 comprises a first part 201 and a second part 203. For example, the filter 200 may be connected to the vehicle 100 such that the first part 201 faces the vehicle's chassis, i.e. the underside of the vehicle 100, and the second part 203 faces the ground. In such an example, the first part 201 may be referred to as a top part and the second part 203 may be referred to as a bottom part. In another example, the filter 200 may be connected to the vehicle 100 such that the second part 203 faces the vehicle's chassis, i.e. the underside of the vehicle 100, and the first part 201 faces the ground. In such an example, the second part 203 may be referred to as a top part and the first part 201 may be referred to as a bottom part.

As also seen in all FIGS. 3a-3d, the first part 201 comprises a first cilia layer 205. The first cilia layer 205 comprises a plurality of flexible or more rigid pins or protrusions arranged to trap at least some particles in the air 101 flowing into the filter 200 when the first cilia layer 205 is electrostatically charged by an electromagnetic field. The cilia layer can be made of any material that is suitable for electrostatic and/or electromagnetic conduction e.g. nylon or polyester. Dimensions can be adapted to what can be fitted under the vehicle without compromising the clearance demand, from e.g. 5-100 mm. The first cilia layer 205 may also be described as comprising a plurality of hair-like protrusions, or hair-like structures that extend outwards from the first part 201. The first cilia layer 205 is arranged on the first part 201 such that they face the second part 203. The first cilia layer 205 may be referred to as a first artificial cilium carpet, a first synthetic cilium carpet or a first cilium like carpet etc. and the second cilia layer 208 may be referred to as a second artificial cilium carpet, a second synthetic cilium carpet, a second cilium like carpet etc. Thus, the filter 200 may be described as comprising at least one artificial cilium carpet or cilium comprised between the first and second parts 201, 203. The first and second parts 201, 203 may be for example plastic sheets.

Figure 3A:
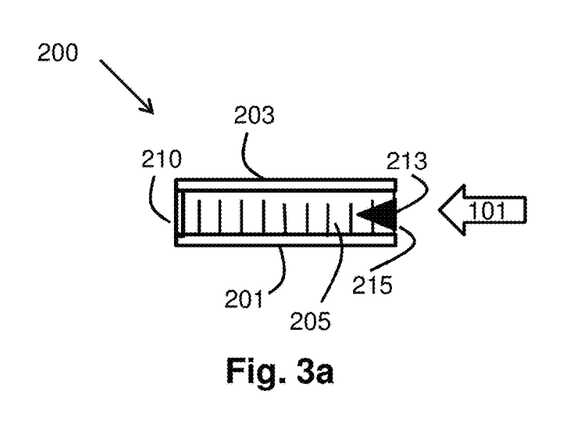
FIGS. 3a, 3b, 3c and 3d are schematic drawings illustrating a filter.
Figure 3B:
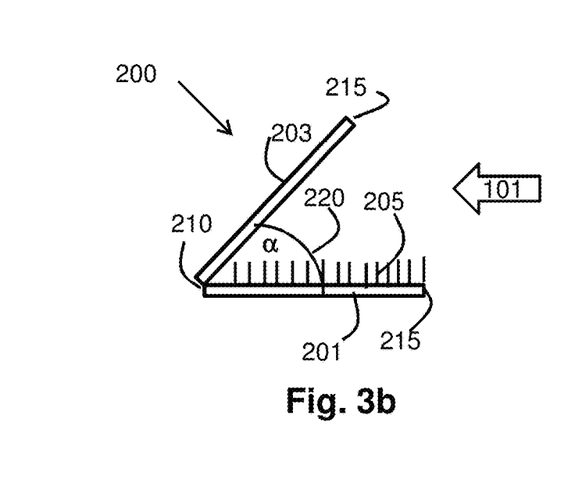
Figure 3C:
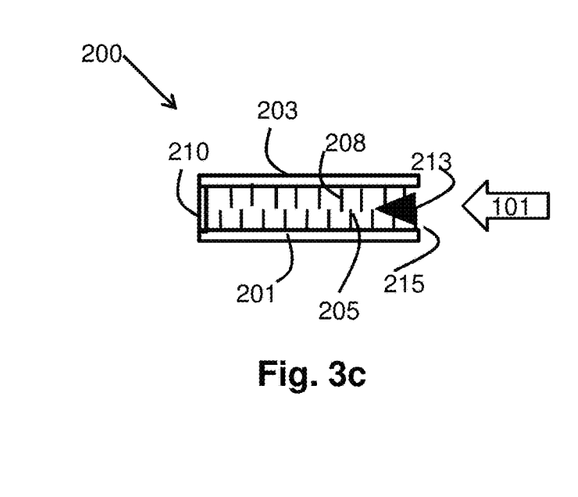
Figure 3D:
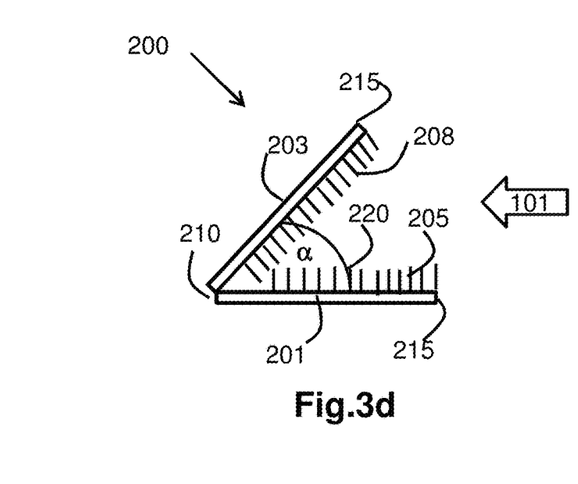

FIGS. 3a and 3b illustrate an example where the first part 201 comprises the first cilia layer 205. FIGS. 3c and 3d illustrate another example where also the second part 203 comprises a second cilia layer 208. Thus, both the first and second parts 201, 203 comprise cilia layers 205, 208. Similar to the first cilia layer 205, the second cilia layer 208 also comprises a plurality of flexible pins or protrusions arranged to trap at least some particles in the air 101 flowing into the filter 200 when the second cilia layer 208 is electrostatically charged by an electromagnetic field. The number of pins in the second cilia layer 208, their length, diameter and material may be the same as in the first cilia layer 205 or they may be different. The first and second parts 201, 203 are arranged such that the first and second cilia layers 205, 208 face each other. In both the first and second cilia layers 205, 208, the plurality of pins have one free end and one fixed end connected to the respective first and second part 201, 203.

The first and second parts 201, 203 are arranged such that the filter 200 can be in an open position, as seen in FIGS. 3b and 3d, and such that the filter 200 can be in a closed position, as seen in FIGS. 3a and 3c. The first and second parts 201, 203 may be releasably connected to each other at a first end 210, and/or the first and second parts 201, 203 may be hingedly connected to each other at the first end 210. When the filter 200 is in the open position, the first and second parts 201, 203 may be arranged such that they are relatively offset by an angle 220 between them. The angle 220 is larger than zero when the filter 200 is in the open position. When the filter 200 is in the closed position, the angle 213 may be substantially zero, i.e. there may be no angle between the first and second parts 201, 203. When the filter 200 is in the open position, it may be possible to perform cleaning, inspection and maintenance of the filter 200. The first part 201 and the second part 203 may together be seen as a box or a container arranged to be in a closed position and open position.

Figure 4:
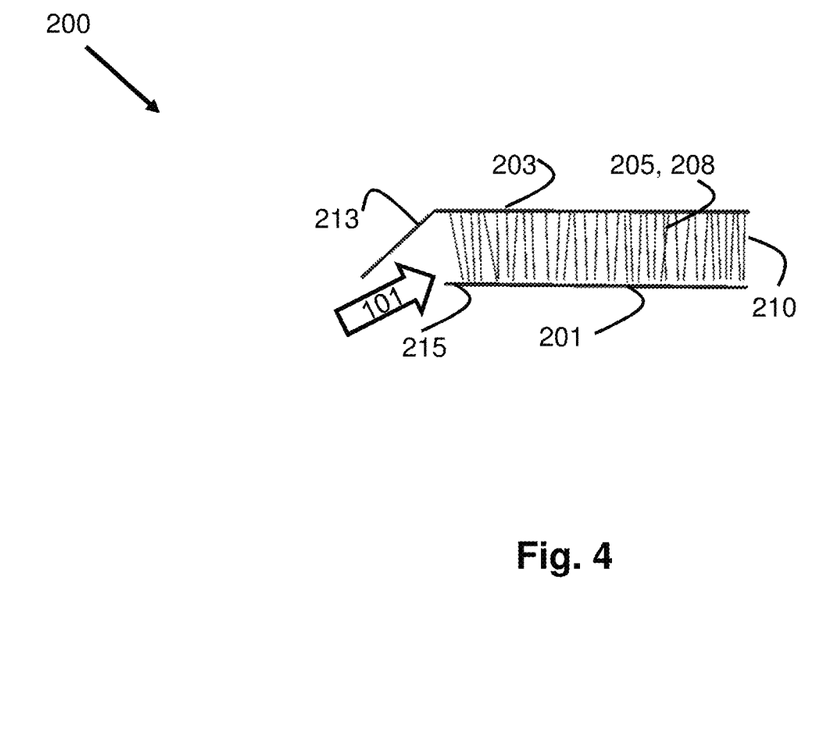
FIG. 4 is a schematic drawing illustrating a filter.

At a second end 215 of the first part 201 and second part 203, the filter 200 comprises an air inlet 213. The air inlet 213 may be in the form of that the filter 200 is open in one end. The air inlet 213 may be an air pressure vent, the air inlet 213 may be a hatch arranged to open when air pressure is present and to be closed when there is no air pressure present. FIG. 4 illustrates an example of the filter 200 where the air inlet 213 is in the form of a hatch. The air flow 101 flows into the filter 200 through the air inlet 213. The air inlet 213 may have an air pressure controlled opening, the opening of the air inlet 213 may be obtained e.g. by electronics set by an odometer or it may be manually opened by a user of the vehicle 100.

A controlled closing and opening of the filter 200 may be obtained in various ways in order to let air 101 with particles 103 inside the filter 200 when the vehicle 100 is driving at a certain speed, for example at low speed while driving in urban areas e.g. 15-50 km/h. Driving at higher speed, 70 km/h or more, may allow the box to close to avoid the particles 103 to blow out again. Opening/closing of the filter may for instance be accomplished by an air pressure controlled opening or an electronic set by an odometer which is a device used for measuring the distance travelled by the vehicle 100. The filter 200 may be arranged such that the air 101 flows into the filter 200 via the air inlet 213 when the vehicle 100 moves. When the vehicle 100 moves it has a speed larger than zero; furthermore, the speed may be a forward or backward speed.

Figure 5A:
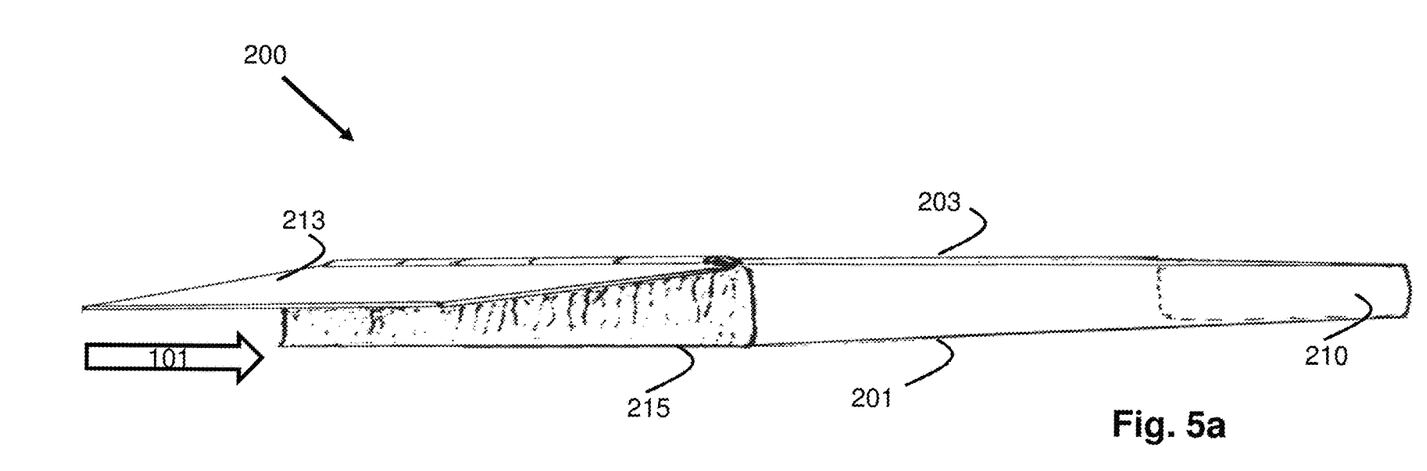
FIGS. 5a and 5b are schematic drawings illustrating a filter in open and closed position.
Figure 5B:
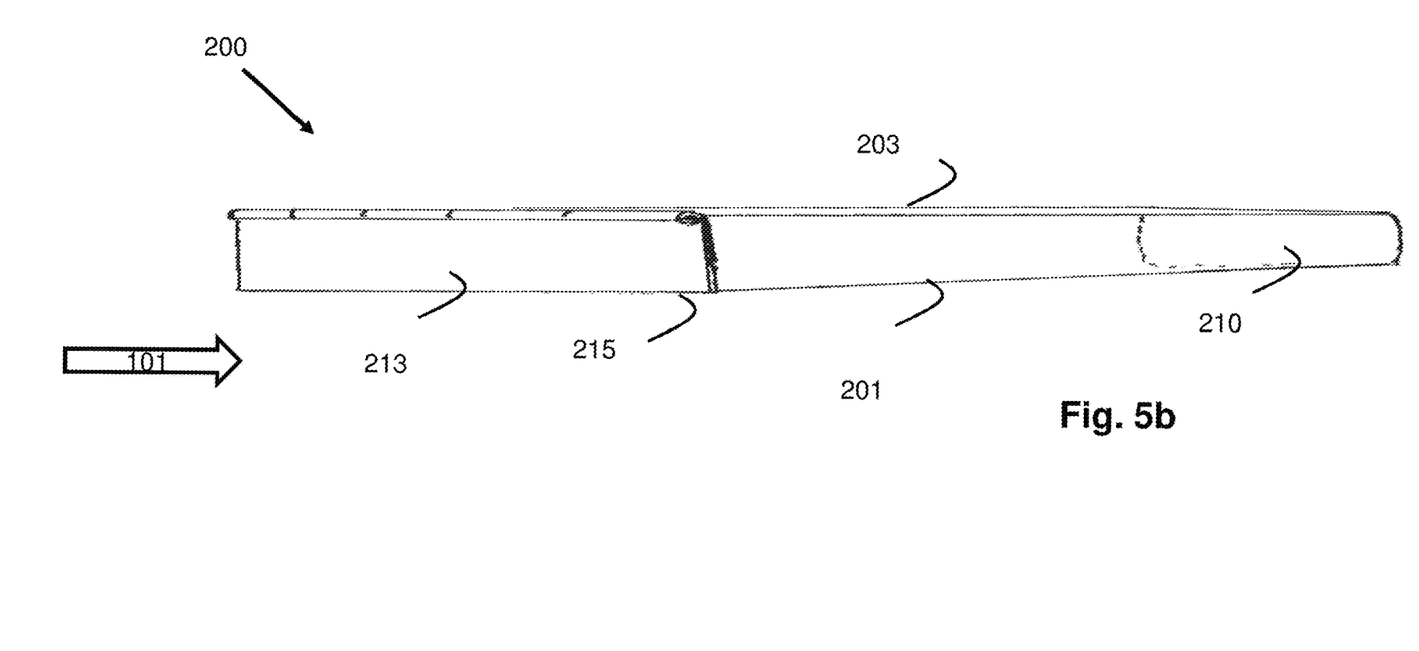

FIG. 5a illustrates an example of the filter 200 in the open position and FIG. 5b illustrates an example of the filter 200 in the closed position, both when the air inlet 213 is exemplified by a hatch at the second end 215. The hatch 213 can be solid or allow some level of filtering of particles. The cilia layers 205, 208 are not seen in FIGS. 5a and 5b, but they are inside the filter 200.

There may be an air outlet at the first end 210 of the filter 200 such that the air 101, after the particles have been trapped in the cilia layer, flows out of the filter 200. In other words, clean air flows out of the filter through the air outlet at the first end 210.

As mentioned earlier, the first cilia layer 205 is arranged to trap at least some particles 103 in the air flowing into the filter 200 via the air inlet 213 when the first cilia layer 205 is electrostatically charged by an electromagnetic field. This is also valid for the second cilia layer 208. In order for the cilia layers 205, 208 to be electrostatically charged by the electromagnetic field, the filter 200 is located in proximity of an electromagnetic field in the vehicle 100. An electromagnetic field may be created for example by a vehicle battery (not shown). Thus, by using the vehicle battery's Electromagnetic compatibility (EMC) field, ionic molecules and aerosols can be attached to the first and second cilia layer 205, 208 while driving at a speed, e.g. driving at low speed in city traffic. This is enabled by using the principles of electrostatic precipitation. The principle of electrostatic precipitation may be shortly described as particle collection that uses electrostatic forces. The air 101 flows through the air inlet 213 through the front of the vehicle 100 and is led on under the battery where it is trapped in the filter 200 that is charged by the battery pack's electromagnetic field.

Figure 6A:
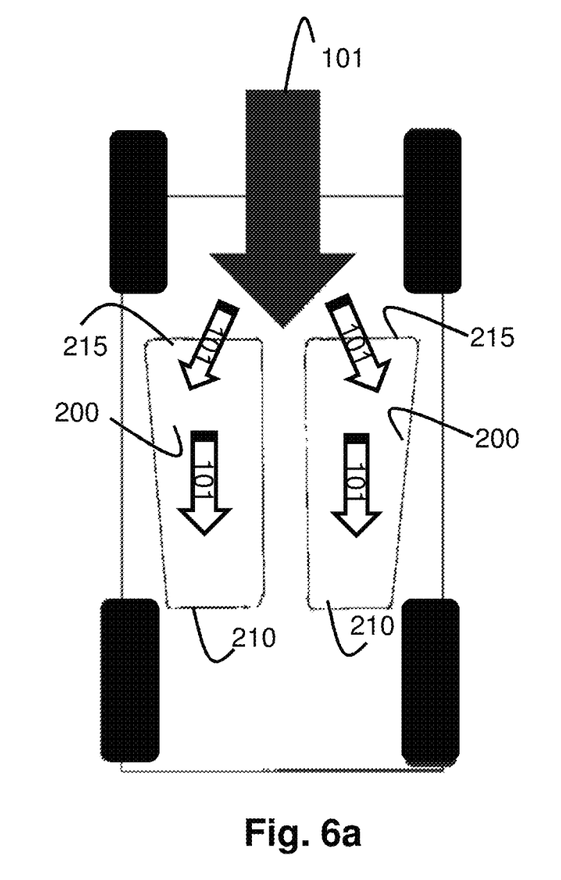
FIGS. 6a, 6b, 6c and 6d are schematic drawings illustrating a filter.
Figure 6B:
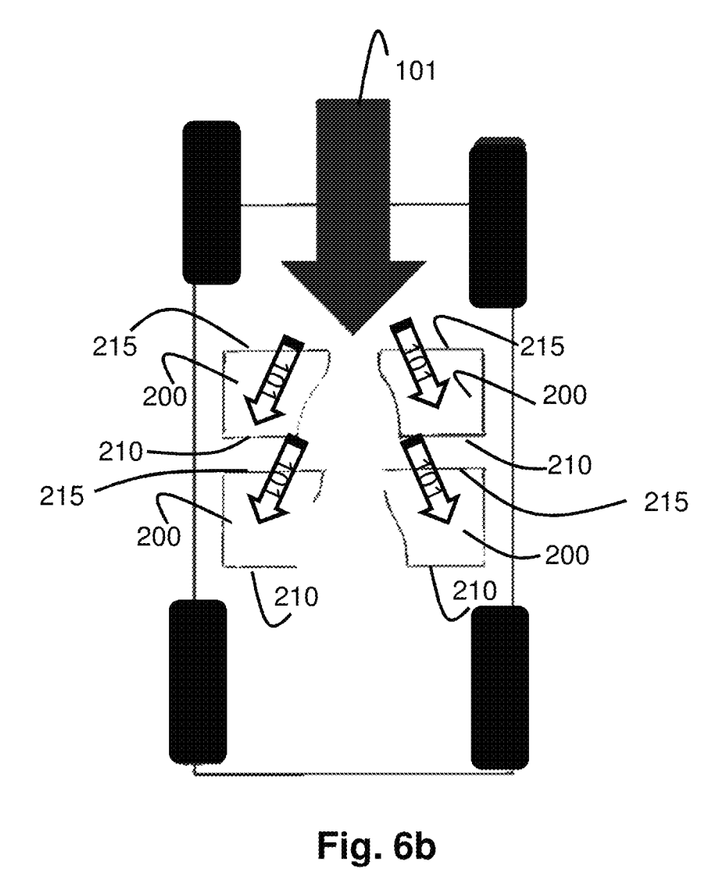
Figure 6C:
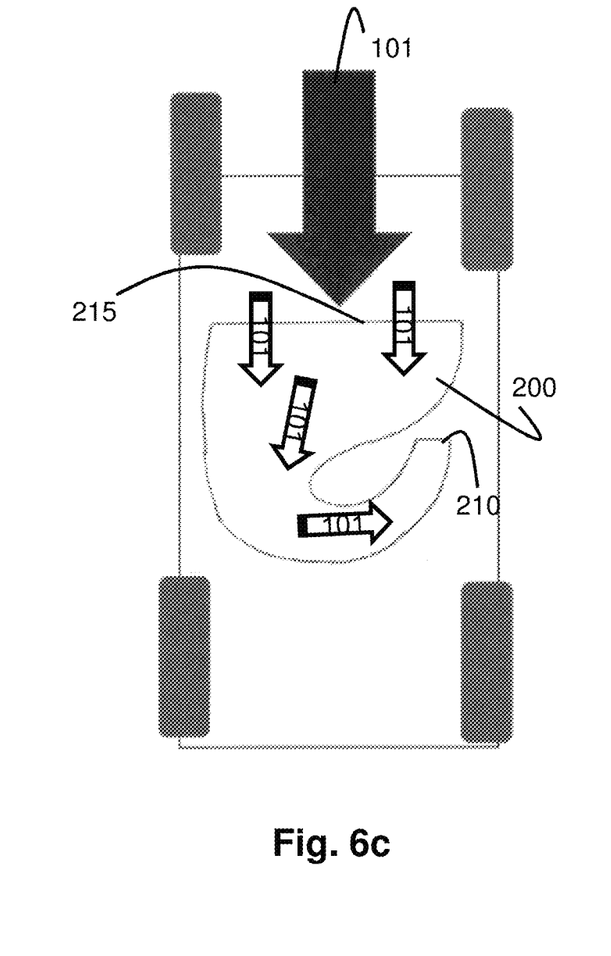
Figure 6D:
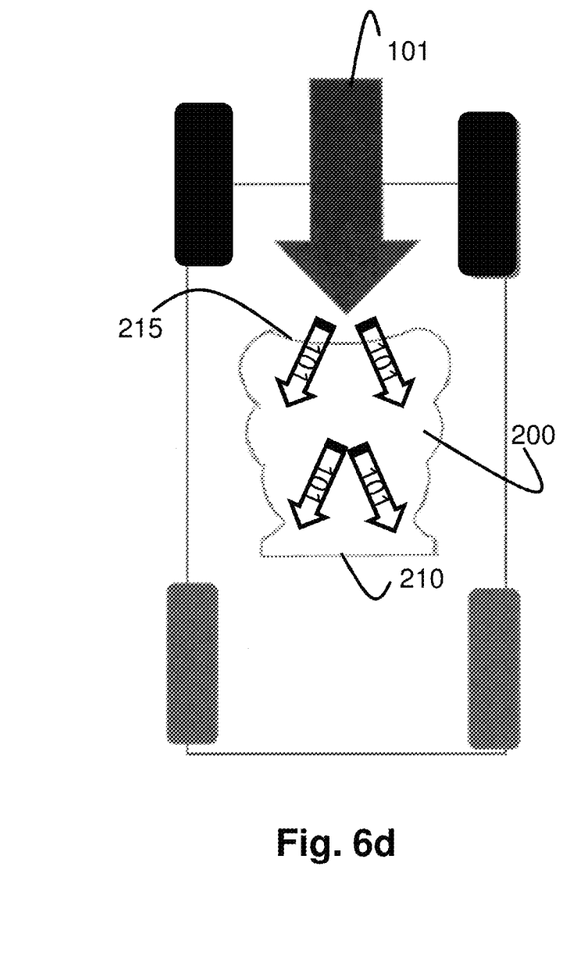

The filter 200 may have various shapes and it may be positioned in different positions under the vehicle 100. Furthermore, there may be one, two or more filters 200 connected to the vehicle 100. FIGS. 6a-6d illustrate the vehicle chassis seen from below with different example shapes, positions and number of filters 200. Physical test to design the optimal shape must be done for each vehicle and traffic environment. The arrows with reference number 101 in FIGS. 6a, 6b, 6c and 6d illustrate the air flow 101. FIG. 6a illustrates an example with two filters 200, where the filters 200 have substantially rectangular shapes and are positioned side by side under the vehicle 100. FIG. 6b illustrates an example with four filters 200 each having a substantially quadratic shape. FIG. 6c illustrates an example with one filter 200 being substantially j-shaped and having a second end 215 which is wider than the first end 210. FIG. 6d illustrates an example with one filter 200 having a cloud shape. In all examples illustrated in FIGS. 6a, 6b, 6c and 6d, the filters 200 are positioned substantially in the centre under the vehicle 100. However any other suitable position is also applicable such as e.g. the front part, the back part, the left side, the right side etc. The position of the filter 200 under the vehicle 100 should be such that the air flow 101 is able to enter into the filter 200.

The filter 200 may have a dimension so that it is suitable to be connected to the vehicle chassis. For this to be possible, the depth of the filter 200 may be of a magnitude such that the filter 200 does not touch the ground when it is connected to the vehicle 100, i.e. there needs to be a certain distance from the filter 200 to the ground. The length and the width of the filter 200 are limited by the vehicle chassis size, i.e. the filter 200 should not be larger than the vehicle chassis.

Figure 7:
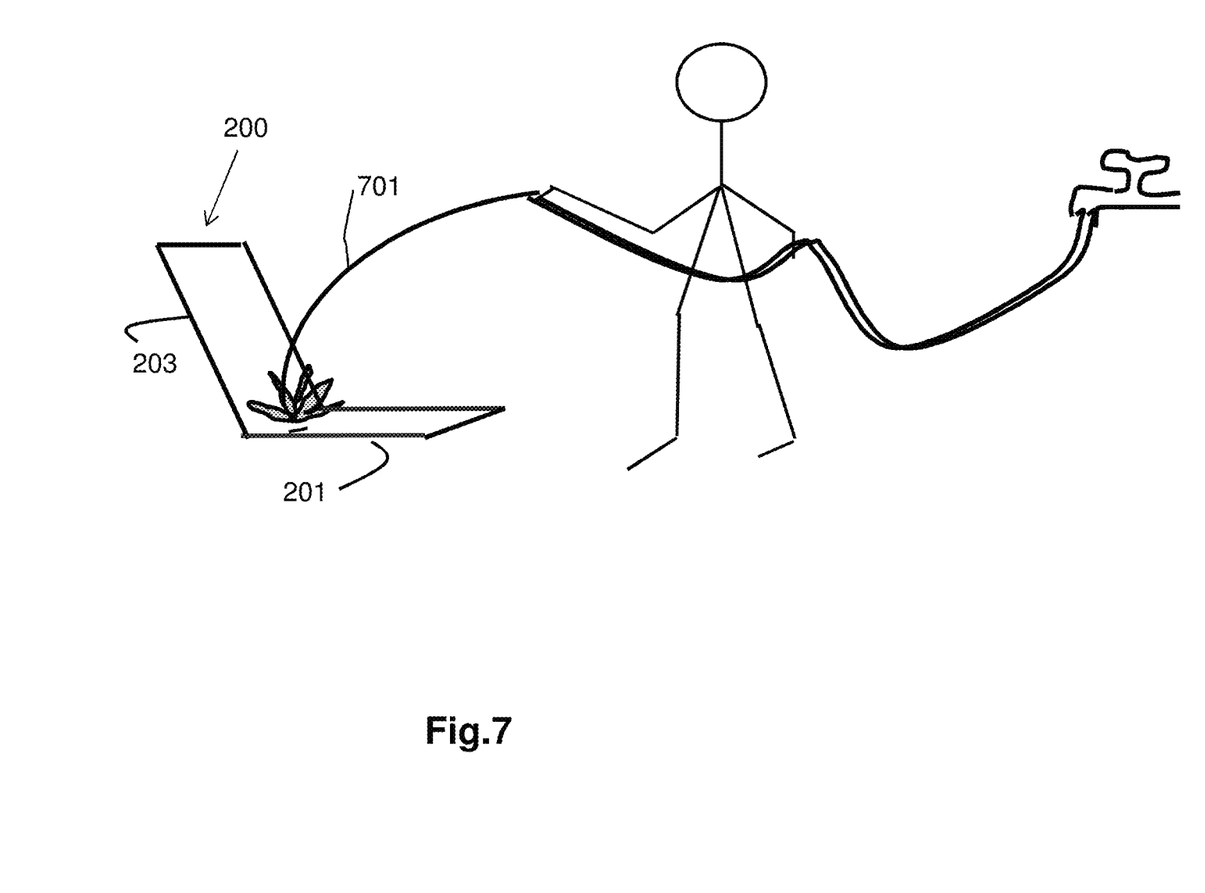
FIG. 7 is a schematic drawing illustrating cleaning of a filter.

As seen in FIG. 7, the first and second cilia layer 205, 208 that traps the particles 103 can easily be cleaned, e.g. by washing with water 701, since the filter 200 can be opened. The cleaning can be done for example in connection to service or other occasion at an environmental service station.

The embodiments herein may have a small effect for one vehicle 100, but in plural they instead relate to the concept of "traffic" and the effect is thus multiplied by at least thousands. An argument for cleaning the city air will work in large scale in highly traffic dense areas such as for example Shanghai. With the embodiments therein, the vehicle 100 will actually improve the climate and human health where it is most needed. The trapping of particles done by one vehicle 100 may be negligible but multiplied with a million, it will have an impact. The absorbent from one vehicle 100 is also negligible but multiplied with a million, it will have an impact.

Figure 8:
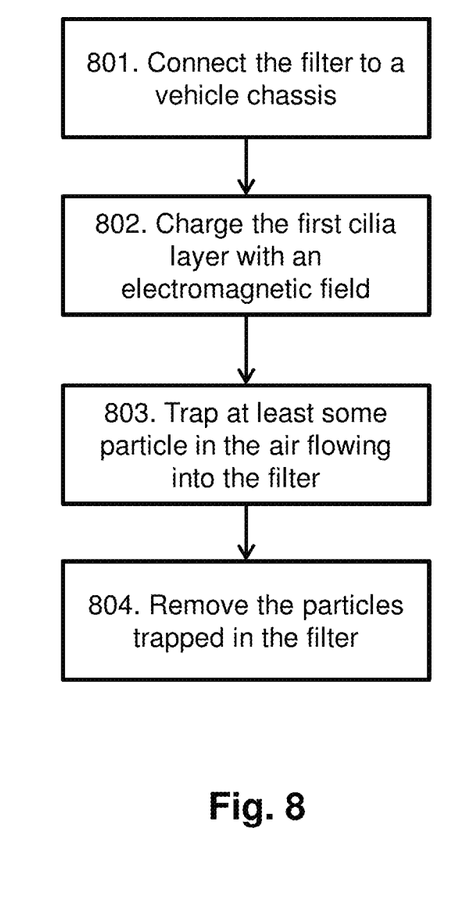
FIG. 8 is a flow chart illustrating a method.

FIG. 8 is a flow chart illustrating an example of a method for trapping particles 103 in a vehicle's 100 outside surrounding air with at least one filter 200. The method comprises at least one of the following steps, which steps may be performed in any suitable order than described below:

Step 801

Connect the filter 200 to a vehicle chassis and such that one of a first and second parts 201, 203 comprised in the filter 200 faces the vehicle chassis and the other part 201, 203 faces ground. The first part 201 comprises a first cilia layer 205. An air inlet 213 is arranged in one end of the filter 200.

The filter 200 may be arranged to be in a closed position when the first and second parts 201, 203 are arranged on top of each other and such that the first cilia layer 205 faces the second part 203. The filter 200 may be arranged to be in an open position when the first and second parts 201, 203 are arranged such that they are relatively offset by an angle 220 larger than zero.

The second part 203 may comprise a second cilia layer 208.

The first part 201 and the second part 203 may be arranged to be hingedly connected to each other.

The air inlet 213 may be an air pressure vent or a hatch.

The first cilia layer 205 may comprise a plurality of pins having one fixed end connected to the first part 201 and one free end.

The first and second cilia layers 205, 208 may be made of a material that is conductive for electromagnetic and/or electrostatic charges e.g. nylon or polyester.

The filter 200 may be releasably connected to the vehicle chassis.

Step 802

Charge the first cilia layer 205 with an electromagnetic field. The electromagnetic field may be created by a vehicle battery.

Step 803

Trap at least some particles 103 in the air 101 flowing into the filter 200 via the air inlet 213 when the first cilia layer 205 is electrostatically charged by the electromagnetic field.

Step 804 (Optional)

Remove the particles 103 trapped in the filter 200 when the filter 200 is in an open position.

Figure 9:
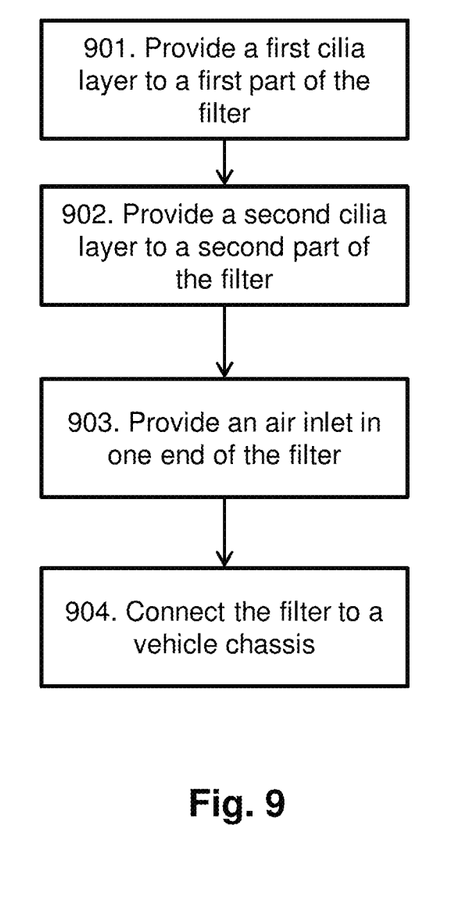
FIG. 9 is a flow chart illustrating a method.

FIG. 9 is a flow chart illustrating an example of a method for connecting, to a vehicle 100, at least one filter 200 for trapping particles 103 in a vehicle's 100 outside surrounding air. The method comprises at least one of the following steps, which steps may be performed in any suitable order than described below:

Step 901
Provide a first cilia layer 205 to a first part 201 of the filter 200.

The first cilia layer 205 may comprise a plurality of pins having one fixed end connected to the first part 201 and one free end.

Step 902 (Optional)
Provide a second cilia layer 208 to a second part 203 of the filter 200.

The first and second cilia layers 205, 208 may be made of a material that is conductive for electromagnetic and/or electrostatic charges e.g. nylon or polyester.

Step 903
Provide an air inlet 213 in one end of the filter 200. The air inlet 213 may be an air pressure vent or a hatch.

Step 904
Connect the filter 200 to a vehicle chassis and such that one of the first part 201 and a second part 203 comprised in the filter 200 faces the vehicle chassis and the other part 201, 203 faces ground. The first cilia layer 205 is arranged to trap at least some particles 103 in the air 101 flowing into the filter 200 via the air inlet 213 when the first cilia layer 205 is electrostatically charged by an electromagnetic field.

The filter 200 may be arranged to be in a closed position when the first and second parts 201, 203 are arranged on top of each other and such that the first cilia layer 205 faces the second part 203. The filter 200 may be arranged to be in an open position when the first and second parts 201, 203 are arranged such that they are relatively offset by an angle 220 larger than zero.

The first part 201 and the second part 203 may be arranged to be hingedly connected to each other.

The electromagnetic field may be created by a vehicle battery.

The particles 103 trapped in the filter 200 may be removed when the filter 200 is in an open position.

The filter 200 may be releasably connected to the vehicle chassis.

The embodiments herein are not limited to the above described embodiments. Various alternatives, modifications and equivalents may be used. Therefore, the above embodiments should not be taken as limiting the scope of the embodiments, which is defined by the appending claims. A feature from one embodiment may be combined with one or more features of any other embodiment.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A vehicle, comprising:
at least one filter for trapping particles in a vehicle's outside surrounding air, wherein the filter comprises a first part and a second part, wherein the first part comprises a first cilia layer, wherein an air inlet is arranged in one end of the filter, wherein the first cilia layer is arranged to trap at least some particles in the air flowing into the filter via the air inlet when the first cilia layer is electrostatically charged by an electromagnetic field, and wherein the filter is connected to a vehicle chassis and such that one of the first and second parts faces the vehicle chassis and the other part faces ground and the air flows parallel to the vehicle chassis between the first part and the second part, thereby encountering the first cilia layer disposed between the first part and the second part.

2. The vehicle according to claim 1, wherein the filter is arranged to be in a closed position when the first and second parts are arranged on top of each other and such that the first cilia layer faces the second part, and wherein the filter is arranged to be in an open position when the first and second parts are arranged such that they are relatively offset by an angle larger than zero.

3. The vehicle according to claim 1, wherein the second part comprises a second cilia layer and the air flows parallel to the vehicle chassis between the first part and the second part, thereby simultaneously encountering the first cilia layer and the second cilia layer both disposed between the first part and the second part.

4. The vehicle according to claim 1, wherein the first part and the second part are arranged to be hingedly connected to each other.

5. The vehicle according to claim 1, wherein the electromagnetic field is created by a vehicle battery.

6. The vehicle according to claim 1, wherein the air inlet is an air pressure vent or a hatch.

7. The vehicle according to claim 1, wherein the first cilia layer comprises a plurality of pins having one fixed end connected to the first part and one free end.

8. The vehicle according to claim 1, wherein the first and second cilia layers are made of a material that is conductive for electromagnetic and/or electrostatic charges.

9. The vehicle according to claim 1, wherein the particles trapped in the filter can be removed when the filter is in an open position.

10. The vehicle according to claim 1, wherein the filter is releasably connected to the vehicle chassis.

11. A method for trapping particles in a vehicle's outside surrounding air with at least one filter, the method comprising:
connecting the filter to a vehicle chassis and such that one of first and second parts comprised in the filter faces the vehicle chassis and the other part faces ground, the first part comprising a first cilia layer, and an air inlet is arranged in one end of the filter;
charging the first cilia layer with an electromagnetic field; and
trapping at least some particles in air flowing into the filter via the air inlet when the first cilia layer is electrostatically charged by the electromagnetic field, wherein the air flows parallel to the vehicle chassis between the first and second parts, thereby encountering the first cilia layer disposed between the first and second parts.

12. A method for connecting, to a vehicle, at least one filter for trapping particles in a vehicle's outside surrounding air, the method comprising:

providing a first cilia layer to a first part of the filter;
providing an air inlet in one end of the filter; and
connecting the filter to a vehicle chassis and such that one of the first part and a second part comprised in the filter faces the vehicle chassis and the other part faces ground;
wherein the first cilia layer is arranged to trap at least some particles in air flowing into the filter via the air inlet when the first cilia layer is electrostatically charged by an electromagnetic field, and
wherein the air flows parallel to the vehicle chassis between the first part and the second part, thereby encountering the first cilia layer disposed between the first part and the second part.

* * * * *